United States Patent [19]

Cole et al.

[11] 3,937,760

[45] Feb. 10, 1976

[54] PROCESS FOR PRODUCING MULTIBLOCK COPOLYMER AND PRODUCTS PRODUCED THEREBY

[75] Inventors: William Max Cole, Norton; Shingo Futamura, Seville, both of Ohio

[73] Assignee: The Firestone Tire & Rubber Company, Akron, Ohio

[22] Filed: Apr. 29, 1974

[21] Appl. No.: 464,871

[52] U.S. Cl. ......... 260/880 B; 260/878 B; 260/879; 260/83.7
[51] Int. Cl.² ...................... C08L 9/02; C08L 9/06
[58] Field of Search ...................... 260/880 B, 878 B

[56] References Cited
UNITED STATES PATENTS

| | | | |
|---|---|---|---|
| 3,149,182 | 9/1964 | Porter | 260/880 B |
| 3,198,774 | 8/1965 | Huxtable | 260/83.7 |
| 3,297,793 | 1/1967 | Dollinger | 260/880 B |
| 3,431,323 | 3/1969 | Jones | 260/880 B |
| 3,525,781 | 8/1970 | Scoggin | 260/880 B |
| 3,560,593 | 2/1971 | Hsieh | 260/880 B |
| 3,703,567 | 11/1972 | Sutter | 260/880 B |
| 3,780,139 | 12/1973 | Sutter | 260/880 B |

OTHER PUBLICATIONS

D. C. Allport, "Block Copolymers", John Wiley & Sons, New York, received at U.S. Patent Office Aug. 21, 1973, pp. 81–87 and 139–151.

*Primary Examiner*—Paul R. Michl

[57] ABSTRACT

The process disclosed herein involves the continuous preparation of a multiblock copolymer of two monomers or more such as butadiene and styrene, butadiene and isoprene, etc. This process comprises the alternate feeding of first one monomer stream and then another monomer stream differing in monomer composition from the first monomer stream, each stream of monomer being interrupted while the other stream of monomer is being fed continually into the polymerization system containing an anionic polymerization catalyst capable of polymerizing each of said monomers. A product stream is withdrawn from the polymerization system at the same rate as the total of the feed streams, thereby effecting a continual flow through the polymerization system. The rate of catalyst feed is controlled to give the desired molecular weight to the multiblock copolymer; the size of each block in the copolymer is controlled by the time of flow of the respective monomer and the concentration of monomer in the monomer feed; and the number of blocks is controlled by the number of alternating feed steps that are performed during the residence time in the polymerization system.

16 Claims, No Drawings

PROCESS FOR PRODUCING MULTIBLOCK COPOLYMER AND PRODUCTS PRODUCED THEREBY

BACKGROUND OF THE INVENTION

1. Field of Invention

This invention relates to a continous process for preparing a multiblock copolymer of two monomers such as styrene and butadiene, butadiene and isoprene, etc. More specifically this invention relates to the continous process of producing such multiblock copolymer by alternate feeding of the respective monomers into the continous polymerization system.

2. Related Prior Art

The preparation of block copolymers is generally effected in batch systems. In such cases the reaction is initiated with one monomer, together with diluent and catalyst in the reactor, and polymerization continued until that monomer has been completely polymerized to form the initial block. Then the second monomer is introduced and polymerization continued until that monomer is completely polymerized to form the second block, following which more of the first monomer is introduced to form the third block, etc.

Since it is considered necessary to have the system completely purged of one monomer before introducing the other, either by completing polymerization or by removal of unpolymerized monomer, it had not been considered that such multiblock copolymers could be produced by a continuous system.

British Pat. No. 1,160,234 is typical of the prior art in which a block copolymer of butadiene and isoprene is prepared in a batch operation. There is no mention of a continuous process for preparing the three block copolymer described therein.

U.S. Pat. Nos. 3,231,635 and 3,265,765 are typical prior art disclosures relating to the batch production of block copolymers of styrene and butadiene.

U.S. Pat. No. 3,198,774 discloses a continuous process for preparing block copolymers of butadiene and styrene using an alkyl halide to prevent gelation and reactor plugup. However patentees feed the butadiene and styrene simultaneously with the result that of the 22.6 percent styrene found in the resultant copolymer only 13.8 percent (based on total polymer content) is in the form of block copolymer.

STATEMENT OF THE INVENTION

In accordance with the present invention it has been found that block copolymers may be made by a continuous process in which alternate different streams of comonomers are fed continually to a polymerization system, the flow of one stream being terminated while the other stream is being fed to the polymerization system. The reaction mixture is agitated very efficiently to insure quick and uniform distribution of the monomers and initiator or catalyst. Initiator is added to the polymerization system either intermittently or continually at a rate such that the proportion of initiator based on the monomer concentration is such as to give the desired molecular weight in the resultant block copolymer. The polymerization product is flowed from the reaction system at the same rate as the total of the feed streams. The average number of blocks in the resultant multiblock copolymer is determined by the number of alternate cycles of feed stream effected during the residence period in the polymerization system. The molecular weight equivalent of each block is determined by the period of flow of the stream of monomer producing such block, provided the concentration of monomer in the monomer feed is constant.

Depending on the polymerization rate, the change of repeating units from one block of comonomer to the other comonomer repeating units may be gradual in accordance with how long it takes to use up the first comonomer remaining after the flow is terminated and flow of the second comonomer is initiated. This also depends somewhat on the relative polymerization tendencies of the two comonomers. For example with butadiene and styrene, in the presence of each other the butadiene polymerizes much more quickly than the styrene. Therefore when the butadiene flow is terminated and the styrene feed initiated, the butadiene will still polymerize more rapidly and probably be consumed before the styrene polymerization is initiated. Or it is possible that for a brief interim period there may be random copolymerization of the comonomers. This brief intermediate random copolymerization between respective blocks may not be objectionable since they generally produce little or no change in the properties of the resultant copolymers.

However, if it is desired to avoid this brief period of random copolymerization, this can be effected either by a short delay before initiating the flow of the next monomer or by interjecting a stream of diluent, preferably the same as used in the monomer streams, between the termination of the first monomer stream and the initiation of the flow of the second monomer stream. This stream of diluent should be continued only as long as required to complete polymerization of the first monomer. Subsequently after termination of the second monomer, it may be desirable to interject another stream of diluent before introduction of the next stream of comonomer.

However, it may be desirable to interject such a stream of diluent only between streams of monomer where the monomer whose flow has just been terminated has a much slower tendency to polymerize than the monomer whose flow is about to be initiated. In such case the flow of diluent gives such slower monomer sufficient time to polymerize before the faster polymerizing monomer is introduced. In the reverse case where the flow of the faster polymerizing monomer is being terminated and the flow of the slower polymerizing monomer is about to be initiated, an intermediate diluent flow is not as important since the faster monomer may continue to complete polymerization in the presence of the slower monomer. In most cases however, it is found that the abrupt change from one monomer stream to the other does not effect sufficient changes in properties of the ultimate multiblock copolymer that it is necessary to interject such diluent streams.

The monomers suitable for use in the practice of this invention include any vinyl or alphamethyl vinyl compounds capable of being polymerized by an anionic intiator. Particularly useful as comonomers for this purpose are alphaolefins such as ethylene, propylene, butene-1, isobutylene, n-pentene-1, 2-methyl-n-pentene-1, etc. up to olefins having ten carbon atoms; vinyl aryl and alphavinyl aryl compounds such as styrene, alphamethyl styrene, vinyl toluene, vinyl naphthalene, alphamethylvinyl toluene, vinyl diphenyl, and corresponding compounds in which the aromatic nucleus may have other alkyl derivatives up to a total of 8 carbon atoms or may have chlorine attached to the aromatic nucleus such as p-chloro-styrene m-chloro-styrene, 4-chloro-1-vinyl-naphthalene, etc.; dienes such as butadiene-1,3, isoprene, piperylene, chloroprene, and other dienes having up to 8 carbon atoms, acrylonitrile, methacrylonitrile, methyl methacrylate, vinyl acetate, and the like. Any combination of such comonomers may be used in the practice of this invention.

As previously indicated, the molecular weight of the resultant copolymer is determined by the concentration of initiator used in proportion to the total amount of monomer polymerized. This is in accordance with the well known principle that each molecule of initiator produces one molecule of polymer and that the amount of monomer gives as many polymer molecules as there are molecules of initiator. Therefore, the average molecular weight of the product may be obtained by dividing the total number of monomer molecules by the number of initiator molecules.

A "block" of repeating units is generally defined as a sequence or series of eight or more identical repeating units connected to each other. Analyses for block polymers may be made by various methods known in the art. For example, analysis for polystyrene may be made by oxidation with osmium tetraoxide according to the procedure published in Jour. Polymer Sci., Vol. 1, No. 5, P. 429 (1946).

In the process of this invention there may be as few as two blocks but it is generally advantageous to produce copolymers having at least three blocks and preferably at least five blocks. In many cases as many as fifteen or twenty blocks may be desired.

The initiator used in the polymerization is a compound containing a carbon-lithium or carbon-sodium linkage. This includes compounds corresponding to the formulas RLi and RNa, where R is an aliphatic, cycloaliphatic or aromatic hydrocarbon radical containing from 1 to 20 carbon atoms. Among the many compounds suitable for this purpose are methyllithium, ethyllithium, isopropyllithium, n-butyllithium, sec.-butyllithium, t-butyllithium, amyllithium, hexyllithium, p-octyllithium, n-decyllithium, cyclohexyllithium, allyllithium, methallyllithium, phenyllithium, naphthyllithium, p-tolyllithium, p-butylphenyllithium, 4-phenylbutyllithium and the corresponding sodium compounds. Compounds containing two or more such carbon-metal linkages may also be used, such as dilithium butane, polylithium polymers, etc. Mixtures of two or more of the above may be employed. Particularly preferred is n-butyllithium.

Theoretically, each molecule of initiator produces a molecule of polymer, so the initiator level should be the reciprocal of the desired molecular weight in moles of initiator per mole of reactive monomer. In general, however, from 0.01 to 10 millimoles of initiator is required per mole of monomer to be polymerized, preferably from 0.05 to 5 millimole of initiator per mole of monomer.

An amount of initiator is added at the beginning or with the initial stream of monomer to begin the polymerization and in a proportion to give the desired molecular weight. Thereafter initiator is added either intermittently or continually to replace the amount lost in the exit stream. This subsequent addition may be performed during the flow of either or both monomer streams.

In the polymerization system, it is especially important to exclude materials harmful to the initiator. These materials include water, oxygen, carbon dioxide and other similar materials which "kill" or deactivate the initiator. Preferably the incoming monomers and diluent are treated to remove such impurities prior to introduction to the polymerization system.

The diluent is advantageously an aliphatic hydrocarbon of 6–10 carbon atoms which is inert to the initiator employed. The diluent can be one in which the polymer is soluble or partly soluble, or in which the copolymer may be suspended. Pentanes, hexanes, heptanes, cyclohexane, cyclohexene, pentenes, hexenes, heptanes, benzene, and toluene are preferred as diluents, especially hexanes and cyclohexanes. Mixtures of these may also be used.

From 200 to 900 parts by weight of diluent per 100 parts of monomer is generally sufficient to yield a fluid polymer solution or suspension which can be easily handled.

The temperature of the polymerization mass should be maintained between 50° and 175°C. (120°–350°F.), preferably 75°–150°C. (165°–300°F) in order to produce a fast rate of polymerization, and preferably is maintained at a relatively constant temperature throughout the course of the reaction period.

Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more. The outlet for the exit flow of reaction mixture out of the reactor is advantageously located at a point remote from the inlets for the streams of monomer and catalyst.

The polymer product is posttreated according to regular procedures in such cases, preferably dropping the product solution in methanol or isopropanol containing antioxidant, to deactivate the initiator and to precipitate the copolymer which is then separated and dried before analysis and testing.

These copolymers, either by themselves or in blends with other polymers, are very useful in the construction of tires or other elastomeric products such as belts, hose or molded goods. Other polymers suitable for blending with these copolymers include natural rubber, isoprene or butadiene homopolymers, isoprene-styrene copolymers and butadiene-styrene copolymers.

SPECIFIC EMBODIMENTS OF THE INVENTION

The invention is illustrated by the following examples. These examples are given merely for purposes of illustration and are not intended in any way to restrict the scope of the invention nor the manner in which it can be practiced. Unless specified otherwise, parts and percentages are given by weight.

EXAMPLE I

Blends of 25.5 weight percent of butadiene-1,3 and 7.5 weight percent of styrene in cyclohexane are fed alternately into a 6.5 gallon reactor equipped with efficient agitation means, three inlets, an outlet remote from the inlets, and temperature control and measuring devices. A continuous flow of a catalyst stream of 1.5 weight percent n-butyllithium in hexane is also supplied at a rate sufficient to give a polymer having a DSV between 0.8 and 1.0 dg/l. Each styrene metering period is 15 minutes and each butadiene metering period is 7.5 minutes with the volumetric flow rate being constant and such as to give a reactor residence time of one hour. The reaction temperature is maintained at 245°–250°F. After a sufficient time for the system to reach a dynamic steady state, a number of polymer samples are collected at periods of more than one hour apart. The composite of these samples are tested for various properties with the results reported as C in Table I below.

EXAMPLE II

The procedure of Example I is repeated a number of times with variations in the duration of the respective styrene and butadiene feed times. These variations and the resultant variations in properties are also reported below in Table I.

TABLE I

Styrene blend - 7.5% by weight in cyclohexane
Butadiene blend - 25.5% by weight in cyclohexane
Flow rate constant at 6.5 gallons per hour
n-BuLi fed continuously to give polymer DSV of 0.8 – 1.0 dg/l
Temp. 245–250°F.

| Ex No. | Duration of Sty. Cycle (min.) | Duration of Bd. Cycle (min.) | Calc. Aver. No. of Blocks | DSV | % Styr. | 300% Mod. (psi) | Tensile at Break (psi) | Elong. at Break(%) | Shore "A" Hardness |
|---|---|---|---|---|---|---|---|---|---|
| A | 60 | 30 | 1.3 | 1.15 | 40.9 | — | 375 | 260 | 64.0 |
| B | 20 | 10 | 4.0 | 0.83 | 39.8 | 400 | 600 | 600 | 68.5 |
| C | 15 | 7.5 | 5.3 | 0.88 | 40.4 | 400 | 675 | 710 | 67.0 |
| D | 8 | 4 | 10 | 0.88 | 44.9 | 425 | 900 | 910 | 73.5 |

When the two blends were metered simultaneously the product is a very soft, weak polymer with no elastomeric properties.

EXAMPLE III

Two mixtures, one of butadiene at 20 weight percent in hexane, and the other of isoprene at 40 weight percent in hexane, are charged alternately to the 6.5 gallon, well-agitated reactor. The metering time per cycle for the butadiene mixture is 15 minutes, followed by metering of isoprene blend for 7.5 minutes. This metering cycle is repeated throughout the experiment. Both mixtures are metered at a rate of 6.5 gallons per hour while on stream, so that the reactor residence time is one hour during the experiment. Normal butyllithium catalyst is continuously metered at a rate sufficient to give a polymer of 75,000 average molecular weight. The reaction temperature is maintained at 240°F by means of a reactor jacket. The product contains 54 weight percent butadiene. The resulting multiblock copolymer is hydrogenated completely in a batch reactor, using nickel catalyst, to form a thermoplastic elastomer with good stress/strain properties (tensile at break = 960 psi, elongation at break = 740%, 100% modulus = 330 psi), a melting temperature of 95°C and a glass transition temperature of −60°C, showing that a good block copolymer of butadiene and isoprene is made by the process of the invention.

EXAMPLE IV

To a 20-gallon reactor forty pounds of hexane and 110.7 ml. of 15% n-butyllithium are charged. Then the temperature of the mixture is raised to 160°F. and metering of a blend of isoprene/butadiene/hexane (20/30/50) is started. Over a 3 hour period total of 45 pounds of the blend is charged with the temperature maintained at 160°F. The polymer obtained by this method is hydrogenated with Ni catalyst to complete hydrogenation level. The resulting polymer does not show properties of a thermoplastic elastomer. Differential thermal analysis shows that the polymer has a Tg of −55°C but no melting point. These results demonstrate that a copolymer obtained by the simultaneous copolymerization of butadiene and isoprene does not have the desirable properties obtained in the multiblock copolymer obtained in Example III.

EXAMPLE V

The procedure of Example I is repeated a number of times using the following combinations of comonomers:
a. Butadiene and vinyl toluene
b. Isoprene and styrene
c. Butadiene and vinyl naphthalene
d. Isoprene and vinyl diphenyl
e. Butadiene and p-chlorostyrene In each case multiblock copolymers are obtained having desirable properties as in Example I.

EXAMPLE VI

The procedures of Example I and V are repeated with similar results using in place of the n-butyllithium equivalent amounts respectively of n-amyllithium and n-hexyllithium.

EXAMPLE VII

The procedures of Examples I and II are repeated a number of times with similar results using in place of the n-butyllithium equivalent amounts respectively of the following as initiators
a. n-BuNa
b. Isoamyl Na
c. Na naphthalene
d. Na cyclohexane
e. Li cyclohexane In addition to having alternating blocks of individual monomers, it is also possible by the process of this invention to have blocks of one monomer separated by a random copolymer block. This may be effected by using as the second monomer stream a mixture of two or more monomers capable of being copolymerized by the initiator being used. Likewise it is possible to prepare alternating blocks of different types of random copolymers by using as the first monomer feed stream one mixture of two or more monomers and then following this with a second monomer stream comprising a different mixture of two or more monomers. It is also contemplated that there may be more than two different types of alternating blocks, such as three or four different types of blocks such as a block of butadiene, a block of styrene, a block of isoprene, a block of styrene, a block of butadiene, etc. In such cases one or more of the blocks may also be of a random copolymer mixture of two or more monomers. The following examples illustrate some of these block copolymerizations.

EXAMPLE VIII

The procedure of Example I is repeated except that the blend of 7.5 weight percent styrene is replaced with a blend of 7.5 weight percent styrene and 7.5 weight percent of butadiene in cyclohexane. The resultant blocks are of a random copolymer of styrene and butadiene and the block copolymer is substantially of the following structure where B represents a butadiene block and BS a random copolymer block of butadiene and styrene: B-BS-B-BS-B.

EXAMPLE IX

The procedure of Example I is repeated using in place of the butadiene blend a blend of 12.5 weight percent butadiene and 12.5 weight percent isoprene with the resultant copolymer having substantially the following block structure where BI represents the butadiene-isoprene block: BI-S-BI-S-BI.

EXAMPLE X

The procedure of Example I is repeated except that a third blend of 20 weight percent of isoprene in cyclohexane is used with a metering period of 10 minutes. The resulting block copolymer has three types of blocks namely B, S and I.

EXAMPLE XI

The procedure of Example I is repeated except that after the first flow of the first monomer stream the initiator is fed in only during the flow of the styrene streams with the rate of initiator addition being adjusted so that the amount fed during the residence time is the same as in Example I. The results are similar to those of Example I.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. In a process for preparing a multiblock copolymer of two or more monomers, the steps of preparing said copolymer in a continuous system comprising (1) alternately feeding into a highly agitated polymerization system a first monomer stream, and then a second monomer stream, differing in monomer composition from the first monomer stream, each monomer stream being interrupted while the other monomer stream is flowed, and repeating continually the feeding of said alternating streams, (2) adding to the polymerization system an anionic polymerization catalyst capable of polymerizing each of said monomers, the rate of addition of said catalyst being controlled to give the desired molecular weight to the resultant multiblock copolymer, (3) withdrawing from said polymerization system a product stream at the same rate as the total of the said feed streams whereby there is substantially continual flow through said polymerization system.

2. The process of claim 1 in which the size of each block in the resultant multiblock copolymer is controlled by the concentration and the length of the respective periods of flow of the said monomers, a longer period of flow of a stream of fixed concentration of particular monomer producing a higher molecular weight equivalent in the corresponding block of that monomer.

3. The process of claim 1 in which the number of blocks in the resultant multiblock copolymer is controlled by the number of alternating monomer feed steps that are performed during the residence time in said polymerization system.

4. The process of claim 1 in which a single monomer is used in each monomer stream.

5. The process of claim 4 in which the amount of each monomer used is 5–95 percent by weight of the total monomer content.

6. The process of claim 4 in which the monomers are butadiene and styrene.

7. The process of claim 6 in which the anionic catalyst is an n-alkyl lithium.

8. The process of claim 6 in which the anionic catalyst is n-butyl lithium.

9. The process of claim 4 in which the monomers are butadiene and isoprene.

10. The process of claim 9 in which the anionic catalyst is an n-alkyl lithium.

11. The process of claim 9 in which the anionic catalyst is n-butyl lithium.

12. The process of claim 1 in which there are at least three alternate feedings of monomer during the residence period in said system.

13. The process of claim 1 in which there are at least five alternate feedings of monomer during the residence period in said system.

14. The process of claim 1 in which a third monomer stream differing in monomer composition from each of said first and second monomer streams is fed into said polymerization system after each feeding of said second monomer stream and prior to each repetition of the feeding of said first monomer stream.

15. The process of claim 1 in which at least one of said monomer streams is a mixture of at least two copolymerizable monomers.

16. The process of claim 1 in which the multiblock copolymer in said product stream is hydrogenated.

* * * * *